United States Patent
Hoshi et al.

(10) Patent No.: US 6,939,906 B2
(45) Date of Patent: Sep. 6, 2005

(54) BLOCK COPOLYMER COMPOSITION

(75) Inventors: Susumu Hoshi, Yokohama (JP); Yukio Yamaura, Iwatsuki (JP); Junko Kakegawa, Kawasaki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 274 days.

(21) Appl. No.: 10/275,400

(22) PCT Filed: Aug. 31, 2001

(86) PCT No.: PCT/JP01/07532

§ 371 (c)(1),
(2), (4) Date: Nov. 5, 2002

(87) PCT Pub. No.: WO02/094932

PCT Pub. Date: Nov. 28, 2002

(65) Prior Publication Data

US 2003/0176546 A1 Sep. 18, 2003

(30) Foreign Application Priority Data

Mar. 15, 2001 (JP) .................... 2001-073247

(51) Int. Cl.$^7$ .......................... C08K 5/10; C08K 5/13; C08L 53/00
(52) U.S. Cl. ................ 524/291; 524/331; 524/505; 524/571; 525/98; 525/99; 525/314
(58) Field of Search ............ 524/291, 331, 524/505, 571; 525/98, 99, 314

(56) References Cited

U.S. PATENT DOCUMENTS

| | | | |
|---|---|---|---|
| 4,120,915 A | 10/1978 | Fodor et al. | |
| 4,167,545 A | 9/1979 | Fahrbach et al. | |
| 4,939,208 A | 7/1990 | Lanza et al. | |
| 5,227,419 A | 7/1993 | Moczygemba et al. | |
| 6,235,847 B1 * | 5/2001 | Hoshi et al. | ........ 525/314 |

FOREIGN PATENT DOCUMENTS

| | | |
|---|---|---|
| EP | 0 649 873 A1 | 4/1995 |
| JP | 58-141233 A | 8/1983 |
| JP | 2-113007 A | 4/1990 |
| JP | 5-177777 A | 7/1993 |
| JP | 7-97418 A | 4/1995 |
| JP | 2000-7862 A | 1/2000 |
| JP | 2000-186179 A | 7/2000 |

* cited by examiner

*Primary Examiner*—Tae H. Yoon
(74) *Attorney, Agent, or Firm*—Birch, Stewart, Kolasch & Birch, LLP

(57) ABSTRACT

Disclosed is a block copolymer composition comprising a block copolymer (I) comprising at least two polymer blocks (each polymer block (S) comprising vinyl aromatic hydrocarbon monomer units) and at least one polymer block (B) comprising isoprene monomer units and 1,3-butadiene monomer units, and a polystyrene resin (II), wherein, in the block copolymer (I), the amount of the vinyl aromatic hydrocarbon monomer units, the total amount of the isoprene monomer units and the 1,3-butadiene monomer units, and the isoprene monomer unit/1,3-butadiene monomer unit weight ratio are within specific range, wherein the block copolymer (I) has a vinyl aromatic hydrocarbon block ratio (BL) within a specific range, and wherein the block copolymer (I) and the polystyrene resin (II) satisfy a relationship represented by the following formula (1):

$$15+0.25BL \leq Wa \leq 35+0.25BL \qquad (1)$$

wherein BL represents the block ratio of the copolymer (I), and Wa represents the weight percentage, based on the total weight of the copolymer (I) and the resin (II), of the copolymer (I).

4 Claims, No Drawings

BLOCK COPOLYMER COMPOSITION

This application is the national phase under 35 U.S.C. §371 of PCT International Application No. PCT/JP01/07532 which has an International filing date of Aug. 31, 2001, which designated the United States of America.

BACKGROUND OF THE INVENTION

1. Field of the Invention

The present invention relates to a block copolymer composition comprising a block copolymer and a polystyrene resin. More particularly, the present invention is concerned with a block copolymer composition comprising a block copolymer (I) comprising at least two polymer blocks (each polymer block (S) comprising vinyl aromatic hydrocarbon monomer units) and at least one polymer block (B) comprising isoprene monomer units and 1,3-butadiene monomer units, and a polystyrene resin (II), wherein the amount of the vinyl aromatic hydrocarbon monomer units in the block copolymer (I), the total amount of the isoprene monomer units and the 1,3-butadiene monomer units in the block copolymer (I), and the isoprene monomer unit/1,3-butadiene monomer unit weight ratio in the block copolymer (I) are within specific ranges, wherein the block copolymer (I) has a vinyl aromatic hydrocarbon block ratio within a specific range, and wherein the block copolymer (I) and the polystyrene resin (II) satisfy a specific relationship.

A shaped article obtained from the block copolymer composition of the present invention exhibits not only less occurrence of fish eyes, which are gelled masses of a resin (hereinafter, the "fish eye" is frequently referred to simply as an "FE"), but also excellent impact resistance at a temperature as low as 0° C. or lower, excellent transparency, excellent stiffness and excellent elongation. Therefore, the block copolymer composition of the present invention can be advantageously used for producing various shaped articles.

2. Prior Art

A block copolymer comprising vinyl aromatic hydrocarbon monomer units (such as styrene monomer units) and conjugated diene monomer units (such as 1,3-butadiene monomer units) wherein the vinyl aromatic hydrocarbon monomer unit content is relatively high, has various excellent characteristics, such as high transparency and high impact resistance, so that the block copolymer has been used for producing injection-molded products, extrusion-molded products (such as a sheet and a film) and the like. Further, a composition comprising the block copolymer and a styrene polymer has excellent transparency and mechanical properties, so that the composition has been used for producing a sheet, a film and the like.

With respect to the above-mentioned block copolymers and compositions containing the same, a number of proposals have been made in patent documents. For example, in an attempt to improve the transparency and impact resistance of a block copolymer, Unexamined Japanese Patent Application Laid-Open Specification No. Sho 52-58788 (corresponding to U.S. Pat. No. 4,167,545) discloses a branched block copolymer comprising a vinyl aromatic hydrocarbon and 1,3-butadiene, which is obtained by division-wise adding a catalyst to a block copolymerization system. Unexamined Japanese Patent Application Laid-Open Specification No. Sho 53-8688 (corresponding to U.S. Pat. No. 4,120,915) attempts to obtain a block copolymer having an improved thermal stability by a method comprising polymerizing a vinyl aromatic hydrocarbon to obtain a vinyl aromatic hydrocarbon polymer, followed by addition of 1,3-butadiene and a small amount of isoprene to perform a coupling reaction. In an attempt to improve the impact resistance of a block copolymer, Unexamined Japanese Patent Application Laid-Open Specification No. Hei 2-113007 discloses a block copolymer comprising a vinyl aromatic hydrocarbon polymer block and a polymer block composed mainly of isoprene, which has a specific block configuration. As a thermoplastic polymer composition having excellent appearance (such as high transparency or high surface luster) and excellent impact resistance, Unexamined Japanese Patent Application Laid-Open Specification No. Sho 58-141233 discloses a composition comprising a vinyl aromatic hydrocarbon/1,3-butadiene block copolymer and a styrene polymer, wherein the block copolymer is a mixture of polymer chains which have largely different molecular weights and different compositions. For improving the environmental stress cracking resistance of a block copolymer, Unexamined Japanese Patent Application Laid-Open Specification No. Hei 4-277509 (corresponding to U.S. Pat. No. 5,227,419 and European Patent No. 492490) proposes a method for producing a block copolymer which comprises a vinyl aromatic hydrocarbon and 1,3-butadiene and has a tapered block configuration, wherein the method comprises division-wise adding a catalyst to a block copolymerization system. For obtaining a multi-layer sheet made of a thermoplastic resin (a vinyl aromatic hydrocarbon/isoprene block copolymer) which has high stiffness and is improved with respect to rapid shaping at low temperatures and deep-draw shaping, Unexamined Japanese Patent Application Laid-Open Specification No. Hei 5-177777 proposes a multi-layer sheet comprising a surface layer made of a first resin having a specific elastic modulus and a layer made of a second resin, wherein the Vicat softening point ratio of the first resin to the second resin is within a specific range. In an attempt to obtain a block copolymer having excellent transparency and mechanical properties, Unexamined Japanese Patent Application Laid-Open Specification No. Sho 63-145314 (corresponding to U.S. Pat. No. 4,939,208 and European Patent No. 270515) discloses a method for producing a block copolymer having an S-B-B/S-S block configuration, wherein each S independently represents a styrene polymer block, B represents a butadiene polymer block, and B/S represents a butadiene/styrene copolymer block. Further, with a view to improving the transparency and impact resistance of a block copolymer and a composition containing the block copolymer, Unexamined Japanese Patent Application Laid-Open Specification No. Hei 7-97418 proposes a vinyl aromatic hydrocarbon/butadiene block copolymer and a composition comprising the block copolymer and a styrene polymer, in which the block copolymer has characteristic features with respect to the block ratio (the ratio of the total weight of vinyl aromatic hydrocarbon polymer blocks to the total weight of the vinyl aromatic hydrocarbon monomer units), the arrangement of the polymer blocks, the ratio of the butadiene in a vinyl aromatic hydrocarbon/butadiene random copolymer segment, and the like.

However, the conventional block copolymers comprising vinyl aromatic hydrocarbon monomer units and conjugated diene monomer units, and the compositions comprising the block copolymers and a styrene polymer, which block copolymers and compositions are disclosed in the above-mentioned patent documents, have a problem in that shaped articles (such as a sheet) obtained from the block copolymers and the compositions containing the same suffer marked occurrence of FE's which are gelled masses of a resin. The occurrence of FE's in a shaped article is disadvantageous, for example, in that, when the shaped article is subjected to printing, the quality of the resultant print inevitably becomes poor.

SUMMARY OF THE INVENTION

In this situation, the present inventors have made extensive and intensive studies with a view toward developing a block copolymer composition comprising a block copolymer and a polystyrene resin, which can be advantageously used for producing various shaped articles which exhibit not only less occurrence of FE's, but also excellent impact resistance at a temperature as low as 0° C. or lower, excellent transparency, excellent stiffness and excellent elongation. As a result, it has unexpectedly been found that the desired shaped articles can be produced from a block copolymer composition comprising a block copolymer (I) comprising at least two polymer blocks (each polymer block (S) comprising vinyl aromatic hydrocarbon monomer units) and at least one polymer block (B) comprising isoprene monomer units and 1,3-butadiene monomer units, and a polystyrene resin (II), wherein the amount of the vinyl aromatic hydrocarbon monomer units in the block copolymer (I), the total amount of the isoprene monomer units and the 1,3-butadiene monomer units in the block copolymer (I), and the isoprene monomer unit/1,3-butadiene monomer unit weight ratio in the block copolymer (I) are within specific ranges, wherein the block copolymer (I) has a vinyl aromatic hydrocarbon block ratio within a specific range, and wherein the block copolymer (I) and the polystyrene resin (II) satisfy a specific relationship. Based on this finding, the present invention has been completed.

Accordingly, it is a primary object of the present invention to provide a block copolymer composition which can be advantageously used for producing a shaped article which exhibits not only less occurrence of FE's, but also excellent impact resistance at a temperature as low as 0° C. or lower, excellent transparency, excellent stiffness and excellent elongation.

The foregoing and other objects, features and advantages of the present invention will be apparent from the following detailed description and appended claims.

DETAILED DESCRIPTION OF THE INVENTION

According to the present invention, there is provided a block copolymer composition comprising:

(I) a block copolymer comprising:

at least two polymer blocks, each polymer block (S) comprising at least 70% by weight of vinyl aromatic hydrocarbon monomer units, and at least one polymer block (B) comprising one or more unit polymer blocks selected from the group consisting of the following unit polymer blocks (a), (b) and (c):

(a) a unit polymer block comprising isoprene monomer units and optionally vinyl aromatic hydrocarbon monomer units, (b) a unit polymer block comprising 1,3-butadiene monomer units and optionally vinyl aromatic hydrocarbon monomer units, and (c) a unit polymer block comprising isoprene monomer units, 1,3-butadiene monomer units and optionally vinyl aromatic hydrocarbon monomer units, wherein the content of the vinyl aromatic hydrocarbon monomer units in each of the unit polymer blocks (a), (b) and (c) is 0 to less than 70% by weight, wherein the or each polymer block (B) has a configuration comprised of at least one unit polymer block arrangement selected from the group consisting of arrangements (B-1) to (B-5):

(B-1) at least one unit polymer block (a) and at least one unit polymer block (b) in combination, (B-2) at least one unit polymer block (a) and at least one unit polymer block (c) in combination, (B-3) at least one unit polymer block (a), at least one unit polymer block (b) and at least one unit polymer block (c) in combination, (B-4) at least one unit polymer block (b) and at least one unit polymer block (c) in combination, and (B-5) at least one unit polymer block (c) alone, so that the or each polymer block (B) contains isoprene monomer units and 1,3-butadiene monomer units, the amount of the vinyl aromatic hydrocarbon monomer units in the block copolymer (I) and the total amount of the isoprene monomer units and the 1,3-butadiene monomer units in the block copolymer (I) being, respectively, from 60 to 95% by weight and from 40 to 5% by weight, each based on the weight of the block copolymer (I), the block copolymer (I) having an isoprene monomer unit/1,3-butadiene monomer unit weight ratio of from 5/95 to less than 55/45, and wherein the block copolymer (I) has a vinyl aromatic hydrocarbon block ratio (BL) of from 60 to 100% by weight, wherein the vinyl aromatic hydrocarbon block ratio is defined as the weight percentage, based on the total weight of vinyl aromatic hydrocarbon monomer units contained in the block copolymer (I), of a vinyl aromatic hydrocarbon polymer collected by filtration from a reaction mixture obtained by subjecting the block copolymer (I) to an oxidative degradation reaction with tert-butyl hydroperoxide in the presence of osmium tetraoxide at 95° C. in chloroform, wherein the filtration is conducted by means of a glass filter which has a pore size identification No. 4 as specified in JIS R3503, and (II) a polystyrene resin, wherein the block copolymer (I) and the polystyrene resin (II) satisfy a relationship represented by the following formula (1):

$$15+0.25BL \leq Wa \leq 35+0.25BL \tag{1}$$

wherein BL represents the vinyl aromatic hydrocarbon block ratio of the block copolymer (I), and Wa represents the weight percentage, based on the total weight of the block copolymer (I) and the polystyrene resin (II), of the block copolymer (I).

For easy understanding of the present invention, the essential features and various preferred embodiments of the present invention are enumerated below.

1. A block copolymer composition comprising:

(I) a block copolymer comprising:

at least two polymer blocks, each polymer block (S) comprising at least 70% by weight of vinyl aromatic hydrocarbon monomer units, and at least one polymer block (B) comprising one or more unit polymer blocks selected from the group consisting of the following unit polymer blocks (a), (b) and (c):

(a) a unit polymer block comprising isoprene monomer units and optionally vinyl aromatic hydrocarbon monomer units, (b) a unit polymer block comprising 1,3-butadiene monomer units and optionally vinyl aromatic hydrocarbon monomer units, and (c) a unit polymer block comprising isoprene monomer units, 1,3-butadiene monomer units and optionally vinyl aromatic hydrocarbon monomer units, wherein the content of the vinyl aromatic hydrocarbon monomer units in each of the unit polymer blocks (a), (b) and (c) is 0 to less than 70% by weight, wherein the or each polymer block (B) has a configuration comprised of at least one unit polymer block arrangement selected from the group consisting of arrangements (B-1) to (B-5):

(B-1) at least one unit polymer block (a) and at least one unit polymer block (b) in combination, (B-2) at least one unit polymer block (a) and at least one unit polymer block (c) in combination, (B-3) at least one unit polymer block (a), at least one unit polymer block (b) and at least one unit polymer block (c) in combination, (B-4) at least one unit polymer block (b) and at least one unit polymer block (c) in combination, and (B-5) at least one unit polymer block (c) alone, so that the or each polymer block (B) contains isoprene monomer units and 1,3-butadiene monomer units, the amount of the vinyl aromatic hydrocarbon monomer units in the block copolymer (I) and the total amount of the isoprene monomer units and the 1,3-butadiene monomer units in the block copolymer (I) being, respectively, from 60 to 95% by weight and from 40 to 5% by weight, each based on the weight of the block copolymer (I), the block copolymer (I) having an isoprene monomer unit/1,3-butadiene monomer unit weight ratio of from 5/95 to less than 55/45, and wherein the block copolymer (I) has a vinyl aromatic hydrocarbon block ratio (BL) of from 60 to 100% by weight, wherein the vinyl aromatic hydrocarbon block ratio is defined as the weight percentage, based on the total weight of vinyl aromatic hydrocarbon monomer units contained in the block copolymer (I), of a vinyl aromatic hydrocarbon polymer collected by filtration from a reaction mixture obtained by subjecting the block copolymer (I) to an oxidative degradation reaction with tert-butyl hydroperoxide in the presence of osmium tetraoxide at 95° C. in chloroform, wherein the filtration is conducted by means of a glass filter which has a pore size identification No. 4 as specified in JIS R3503, and (II) a polystyrene resin, wherein the block copolymer (I) and the polystyrene resin (II) satisfy a relationship represented by the following formula (1):

$$15 + 0.25BL \leq Wa \leq 35 + 0.25BL \quad (1)$$

wherein BL represents the vinyl aromatic hydrocarbon block ratio of the block copolymer (I), and Wa represents the weight percentage, based on the total weight of the block copolymer (I) and the polystyrene resin (II), of the block copolymer (I).

2. The block copolymer composition according to item 1 above, which further comprises at least one stabilizer in an amount of from 0.05 to 3 parts by weight, relative to 100 parts by weight of the block copolymer (I), wherein the stabilizer is selected from the group consisting of 2-(1-(2-hydroxy-3,5-di-t-pentyl-phenyl)ethyl)-4,6-di-t-pentylphenyl acrylate, 2-t-butyl-6-(3-t-butyl-(2-hydroxy-5-methylbenzyl)-4-methylphenyl acrylate, and 2,4-bis ((octylthio)methyl)-o-cresol.

3. The block copolymer composition according to item 1 above, wherein the isoprene monomer unit/1,3-butadiene monomer unit weight ratio of the block copolymer (I) is in the range of from 10/90 to less than 55/45.

4. A method for producing a sheet or a film, which comprises subjecting the block copolymer composition of any one of items 1 to 3 above to extrusion in an extruder under conditions wherein the temperature of the composition is from 190 to 250° C. as measured when the composition is extruded through a die of the extruder, the extrusion being performed such that the sheet or film has a ratio of the modulus in tension as measured in the machine direction to the modulus in tension as measured in the traverse direction in the range of from 0.6 to 1.5.

Hereinbelow, the present invention is described in detail.

In the present invention, the monomer units of the polymer are named in accordance with a nomenclature wherein the names of the original monomers from which the monomer units are derived are used with the term "unit" attached thereto. For example, the term "vinyl aromatic monomer unit" means a monomer unit which is formed in a polymer obtained by the polymerization of the vinyl aromatic monomer. The vinyl aromatic monomer unit has a molecular structure wherein the two carbon atoms of a substituted ethylene group derived from a substituted vinyl group respectively form linkages to adjacent vinyl aromatic monomer units. Similarly, the term "1,3-butadiene monomer unit" means a monomer unit which is formed in a polymer obtained by the polymerization of the 1,3-butadiene monomer. The 1,3-butadiene monomer unit has a molecular structure wherein two carbon atoms of an olefin derived from a 1,3-butadiene monomer respectively form linkages to adjacent 1,3-butadiene monomer units.

The block copolymer composition of the present invention comprises a block copolymer (I) and a polystyrene resin (II).

The block copolymer (I) comprises at least two polymer blocks (each polymer block (S) comprising at least 70% by weight of vinyl aromatic hydrocarbon monomer units) and at least one polymer block (B) comprising one or more unit polymer blocks selected from the group consisting of the following unit polymer blocks (a), (b) and (c):

(a) a unit polymer block comprising isoprene monomer units and optionally vinyl aromatic hydrocarbon monomer units, (b) a unit polymer block comprising 1,3-butadiene monomer units and optionally vinyl aromatic hydrocarbon monomer units, and (c) a unit polymer block comprising isoprene monomer units, 1,3-butadiene monomer units and optionally vinyl aromatic hydrocarbon monomer units.

The or each polymer block (B) has a configuration comprised of at least one unit polymer block arrangement selected from the group consisting of arrangements (B-1) to (B-5):

(B-1) at least one unit polymer block (a) and at least one unit polymer block (b) in combination, (B-2) at least one unit polymer block (a) and at least one unit polymer block (c) in combination, (B-3) at least one unit polymer block (a), at least one unit polymer block (b) and at least one unit polymer block (c) in combination, (B-4) at least one unit polymer block (b) and at least one unit polymer block (c) in combination, and (B-5) at least one unit polymer block (c) alone, so that the or each polymer block (B) contains isoprene monomer units and 1,3-butadiene monomer units.

The amount of the vinyl aromatic hydrocarbon monomer units in the block copolymer (I) is from 60 to 95% by weight, preferably from 65 to 90% by weight, more preferably from 68 to 85% by weight, based on the weight of the block copolymer (I).

The total amount of the isoprene monomer units and the 1,3-butadiene monomer units in the block copolymer (I) is from 40 to 5% by weight, preferably from 35 to 10% by weight, more preferably from 32 to 15% by weight, based on the weight of the block copolymer (I).

When the amount of the vinyl aromatic hydrocarbon monomer units in the block copolymer is less than 60% by weight, or the total amount of the isoprene monomer units and the 1,3-butadiene monomer units in the block copolymer is more than 40% by weight, the stiffness of a shaped article obtained from the block copolymer composition comprising the block copolymer and the polystyrene resin becomes disadvantageously low. On the other hand, when the amount of the vinyl aromatic hydrocarbon monomer units in the block copolymer is more than 95% by weight, and the total amount of the isoprene monomer units and the 1,3-butadiene monomer units in the block copolymer is less than 5% by weight, the impact resistance of a shaped article obtained from the block copolymer composition becomes disadvantageously low.

The block copolymer (I) has an isoprene monomer unit/1,3-butadiene monomer unit weight ratio of from 5/95 to less than 55/45, preferably from 10/90 to less than 55/45, more preferably from 20/80 to less than 55/45. When the isoprene monomer unit/1,3-butadiene monomer unit weight ratio is 55/45 or more, a shaped article obtained from the block copolymer composition comprising the block copolymer and the polystyrene resin has a disadvantageously low impact resistance at a temperature as low as 0° C. or lower. On the other hand, when the isoprene monomer unit/1,3-butadiene monomer unit weight ratio is less than 5/95, a shaped article obtained from the block copolymer composition comprising the block copolymer and the polystyrene resin suffers marked occurrence of FE's.

In the block copolymer (I), each polymer block (S) has a vinyl aromatic hydrocarbon monomer unit content of at least 70% by weight, preferably 80% by weight or more, more preferably 90% by weight or more. Each polymer block (S) may contain monomer units other than vinyl aromatic hydrocarbon monomer units. Examples of monomer units other than vinyl aromatic hydrocarbon monomer units include a 1,3-butadiene monomer unit and an isoprene monomer unit.

As mentioned above, the or each polymer block (B) comprises one or more unit polymer blocks selected from the group consisting of the unit polymer blocks (a), (b) and (c). The content of the vinyl aromatic hydrocarbon monomer units in each of the unit polymer blocks (a), (b) and (c) is from 0 to less than 70% by weight, preferably from 0 to less than 60% by weight, more preferably from 0 to less than 50% by weight.

With respect to the amount of the isoprene monomer units in the unit polymer block (a), there is no particular limitation so long as the total amount of the isoprene monomer units and the 1,3-butadiene monomer units in the block copolymer (I) is from 40 to 5% by weight, based on the weight of the block copolymer (I), and the block copolymer (I) has an isoprene monomer unit/1,3-butadiene monomer unit weight ratio of from 5/95 to less than 55/45. However, the amount of the isoprene monomer units in the unit polymer block (a) is preferably 30% by weight or more, more preferably 40% by weight or more, most preferably 50% by weight or more, based on the weight of the unit polymer block (a).

With respect to the amount of the 1,3-butadiene monomer units in the unit polymer block (b), there is no particular limitation so long as the total amount of the isoprene monomer units and the 1,3-butadiene monomer units in the block copolymer (I) is from 40 to 5% by weight, based on the weight of the block copolymer (I), and the block copolymer (I) has an isoprene monomer unit/1,3-butadiene monomer unit weight ratio of from 5/95 to less than 55/45. However, the amount of the 1,3-butadiene monomer units in the unit polymer block (b) is preferably 30% by weight or more, more preferably 40% by weight or more, most preferably 50% by weight or more, based on the weight of the unit polymer block (b).

With respect to the total amount of the isoprene monomer units and the 1,3-butadiene monomer units in the unit polymer block (c), there is no particular limitation so long as the total amount of the isoprene monomer units and the 1,3-butadiene monomer units in the block copolymer (I) is from 40 to 5% by weight, based on the weight of the block copolymer (I), and the block copolymer (I) has an isoprene monomer unit/1,3-butadiene monomer unit weight ratio of from 5/95 to less than 55/45. However, the total amount of the isoprene monomer units and the 1,3-butadiene monomer units in the unit polymer block (c) is preferably 30% by weight or more, more preferably 40% by weight or more, most preferably 50% by weight or more, based on the weight of the unit polymer block (c). It is preferred that the unit polymer block (c) is a random copolymer.

Examples of vinyl aromatic monomer units used in each polymer block (S) and optionally in the or each polymer block (B) include a styrene monomer unit, an o-methylstyrene monomer unit, a p-methylstyrene monomer unit, a p-tert-butylstyrene monomer unit, a 2,4-dimethylstyrene monomer unit, an a-methylstyrene monomer unit, a vinylnaphthalene monomer unit, a vinylanthracene monomer unit, and a 1,1-diphenylethylene monomer unit. Of these vinyl aromatic monomer units, a styrene monomer unit is especially preferred. These vinyl aromatic monomer units can be used individually or in combination.

With respect to the vinyl aromatic hydrocarbon block ratio (BL) of the block copolymer (I), an explanation is made below (hereinafter, the vinyl aromatic hydrocarbon block ratio is frequently referred to simply as the "block ratio"). Theoretically, the block ratio of the block copolymer (I) is defined as the weight percentage of the vinyl aromatic hydrocarbon monomer units forming a vinyl aromatic hydrocarbon polymer block, based on the total weight of the vinyl aromatic hydrocarbon monomer units contained in the block copolymer (I). However, practically, the block ratio of the block copolymer (I) is defined as the weight percentage, based on the total weight of vinyl aromatic hydrocarbon monomer units contained in the block copolymer (I), of a vinyl aromatic hydrocarbon polymer collected by filtration from a reaction mixture obtained by subjecting the block copolymer (I) to an oxidative degradation reaction with tert-butyl hydroperoxide in the presence of osmium tetraoxide at 95° C. in chloroform, wherein the filtration is conducted by means of a glass filter which has a pore size identification No. 4 as specified in JIS R3503.

The block ratio of the block copolymer (I) is from 60 to 100% by weight, preferably from 70 to 98% by weight, more preferably from 75 to 95% by weight. When the block ratio is less than 60% by weight, a shaped article obtained from the block copolymer composition comprising the block copolymer and the polystyrene resin has a disadvantageously low stiffness and a disadvantageously low impact resistance at a temperature as low as 0° C. or lower.

In the present invention, more specifically, the block ratio of the block copolymer (I) is measured and calculated by the following method. A predetermined amount (30 to 50 mg) of the block copolymer (I) is accurately weighed and added to about 10 ml of chloroform. To the resultant mixture are added osmium tetraoxide as a catalyst and tert-butyl hydroperoxide as an oxidizing agent, followed by boiling at 95° C. for 20 minutes, thereby effecting the oxidative degradation reaction of the block copolymer (I) (see the method described in I. M. Kolthoff et al., J. Polym. Sci. vol. 1, pp. 429–433, 1946). To the resultant reaction mixture is added 200 ml of methanol to precipitate the vinyl aromatic hydrocarbon polymer dissolved-out in the reaction mixture. The precipitated polymer is filtered off by means of a glass filter which has a pore size identification No. 4 as specified in JIS R3503 (specifically, the glass filter has a pore size of from 5 to 10 $\mu$m), thereby obtaining the vinyl aromatic hydrocarbon polymer block(s) as a filtration residue. The obtained filtration residue is weighed. The block ratio (% by weight) of the block copolymer (I) is calculated by the following formula:

Block ratio (% by weight)=(the weight of the filtration residue/the total weight of the vinyl aromatic hydrocarbon monomer units in the predetermined amount of the block copolymer (I))×100.

The total weight of the vinyl aromatic hydrocarbon monomer units in the predetermined amount (30 to 50 mg) of the block copolymer (I) can be obtained as follows. From the weight of each type of the monomers charged in the production of the block copolymer (I), the weight ratio ($r_c$) of the vinyl aromatic hydrocarbon monomer units to the block copolymer (I) is calculated. The total weight of the vinyl aromatic hydrocarbon monomer units in the predetermined amount of the block copolymer (I) can be obtained as the product of the accurate weight of the predetermined amount of the block copolymer (I) multiplied by the above-mentioned weight ratio ($r_c$).

When the block copolymer (I) is one which is obtained from the outside source, the weight ratio ($r_c$) of the vinyl aromatic hydrocarbon monomer units to the block copolymer (I) can be determined by means of an ultraviolet spectrometer. Specifically, the weight ratio ($r_c$) can be determined as follows. A predetermined amount of the block copolymer (I) is accurately weighed and dissolved in a predetermined amount of chloroform to thereby obtain a chloroform solution of the block copolymer. Using an ultraviolet spectrometer, the absorbance at a wavelength of 269 nm (which is ascribed to a benzene ring) of the solution is measured. From the absorbance, the weight of the vinyl aromatic hydrocarbon monomer units in the solution is obtained using a separately prepared calibration curve which shows the relationship between the weight of the vinyl aromatic hydrocarbon monomer units and the absorbance at a wavelength of 269 nm (which is ascribed to a benzene ring). The value obtained by dividing the thus obtained weight (of the vinyl aromatic hydrocarbon monomer units in the solution) by the accurate weight of the predetermined amount of the block copolymer (I) is the weight ratio ($r_c$).

with respect to the unknown sample compositions comprising block copolymers (I) and polystyrene resins (II), the vinyl aromatic hydrocarbon block ratio of the block copolymer (I) in the unknown sample composition can be determined as follows.

(1) when the vinyl aromatic hydrocarbon monomer unit in the block copolymer (I) is a styrene monomer unit:

First, the weight ratio q of the styrene monomer units (which include both of the styrene monomer units in the block copolymer (I) and the styrene monomer units in the polystyrene resin (II)) to the sample composition is determined using an ultraviolet spectrometer in substantially the same manner as mentioned above. Then, the weight ratio t of the polystyrene resin (II) to the sample composition is determined by gel permeation chromatography (GPC).

A predetermined amount of the sample composition is accurately weighed, and the found weight of the predetermined amount of the sample composition is represented by $W_1$ (mg). Using the above-mentioned method in which the oxidative degradation reaction is performed, followed by precipitation and filtration, a filtration residue of polystyrenes (which include both of the polystyrenes derived from the block copolymer (I) and the polystyrenes derived from the polystyrene resin (II)) is obtained. The obtained filtration residue is weighed, and the found weight of the filtration residue is represented by $W_2$ (mg).

The block ratio (% by weight) of the block copolymer (I) in the sample composition is calculated by the following formula:

Block ratio (% by weight)=$[(W_2-tW_1)/\{(q-t)W_1\}] \times 100$.

(2) when the vinyl aromatic hydrocarbon monomer unit of the block copolymer (I) is a vinyl aromatic hydrocarbon monomer unit (v) other than a styrene monomer unit:

First, the weight ratio p of the vinyl aromatic hydrocarbon monomer units (v) to the sample composition is measured using a nuclear magnetic resonance (NMR) apparatus. Then, the weight ratio t of the polystyrene resin (II) to the sample composition is determined by gel permeation chromatography (GPC).

A predetermined amount of the sample composition is accurately weighed, and the found weight of the predetermined determined amount of the sample composition is represented by $W_1$ (mg). Using the above-mentioned method in which the oxidative degradation is performed, followed by precipitation and filtration, a filtration residue (which includes both of the polymers of vinyl aromatic hydrocarbon monomer units (v) and the polystyrenes) is obtained. The obtained filtration residue is weighed, and the found weight of the filtration residue is represented by $W_2$ (mg).

The block ratio (% by weight) of the block copolymer (I) in the sample composition is calculated by the following formula:

Block ratio (% by weight)=$\{(W_2-tW_1)/(pW_1)\} \times 100$.

The block ratio can be controlled by appropriately adjusting the amounts of vinyl aromatic hydrocarbon monomers and conjugated diene monomers (i.e., isoprene monomers and 1,3-butadiene monomers) which are subjected to copolymerization, the relationship between polymerization reactivities of the monomers subjected to copolymerization, and the like. Illustratively stated, the block ratio can be controlled by a method in which vinyl aromatic hydrocarbon monomers and conjugated diene monomers are copolymerized while continuously adding a mixture thereof to the polymerization reaction system, or by a method in which vinyl aromatic hydrocarbon monomers and conjugated diene monomers are subjected to copolymerization in the presence of a polar compound or a randomizing agent. These methods can be employed individually or in combination.

Examples of polar compounds and randomizing agents include ethers, such as tetrahydrofuran, diethylene glycol dimethyl ether and diethylene glycol dibutyl ether; amines, such as triethylamine and tetramethylethylenediamine; thioethers; phosphines; phosphoramides; alkylbenzenesulfonates; and potassium and sodium alkoxides.

As examples of block copolymers (I), there can be mentioned linear block copolymers having block configurations represented by the following formulae (2), (3) and (4):

$$S-(B-S)_n, \tag{2}$$

$$S-(B-S)_n-B \text{ and} \tag{3}$$

$$B-(S-B)_{n+1}. \tag{4}$$

As further examples of block copolymers (I), there can be mentioned radial block copolymers having block configurations represented by the following formulae (5), (6), (7) and (8):

$$((S-B)_k)_{m+2}-X, \tag{5}$$

$$((S-B)_k-S)_{m+2}-X, \tag{6}$$

$$((B-S)_k)_{m+2}-X \text{ and} \tag{7}$$

$$((B-S)_k-B)_{m+2}-X. \tag{8}$$

In the formulae (2) to (8) above, each S independently represents a polymer block (S), which has a vinyl aromatic hydrocarbon monomer unit content of at least 70% by weight, as defined above. In the block copolymer (I), a contiguous block arrangement of a plurality of different polymer blocks S's is possible. For example, the block arrangement represented by the following formulae (9) and (10) can be mentioned:

$$S_1-S_2 \text{ and} \tag{9}$$

$$S_3-S_4-S_5 \tag{10}$$

wherein $S_1$ to $S_5$ are different and each represent a polymer block having a vinyl aromatic hydrocarbon monomer unit content of at least 70% by weight.

In the formulae (2) to (8) above, each B independently represents a polymer block (B), which has a configuration comprised of at least one unit polymer block arrangement selected from the group consisting of the above-mentioned arrangements (B-1) to (B-5), as mentioned above.

In the formulae (5) to (8) above, X represents a residue of a coupling reagent, such as silicon tetrachloride, tin tetrachloride, epoxidized soybean oil, tetraglycidyl-1,3-bisaminomethylcyclohexane, a hydrocarbon polyhalide, a carboxylic ester or a polyvinyl compound; or a residue of a polymerization initiator, such as a multifunctional organolithium compound.

In the formulae (2) to (8) above, each of n, k and m represents a natural number. Each of n, k and m is independently, generally from 1 to 5.

The block copolymer (I) can be produced by conventional methods. For example, the block copolymer (I) can be produced by a method in which a vinyl aromatic hydrocarbon, isoprene and 1,3-butadiene are polymerized in a hydrocarbon solvent in the presence of an organolithium compound as a polymerization initiator.

Examples of hydrocarbon solvents used for producing the block copolymer (I) include aliphatic hydrocarbons, such as butane, pentane, hexane, isopentane, heptane, octane and isooctane; alicyclic hydrocarbons, such as cyclopentane, methylcyclopentane, cyclohexane, methylcyclohexane and ethylcyclohexane; and aromatic hydrocarbons, such as benzene, toluene, ethylbenzene and xylene. These hydrocarbon solvents can be used individually or in combination.

The organolithium compound, which is used as a polymerization initiator for producing the block copolymer (I), means an organic compound having in a molecule thereof at least one lithium atom. That is, the organolithium compound can be any one of an organomonolithium compound, an organodilithium compound and an organopolylithium compound. Examples of organolithium compounds include ethyllithium, n-propyllithium, isopropyllithium, n-butyllithium, sec-butyllithium, tert-butyllithium, hexamethylenedilithium, butadienyldilithium and isoprenyldilithium. These organolithium compounds can be used individually or in combination.

When the block copolymer (I) is produced by the above-mentioned method, the polymerization reaction conditions are as follows. The polymerization reaction temperature is generally from −10 to 150° C., preferably from 40 to 120° C. The polymerization reaction time varies depending on other reaction conditions; however, the polymerization reaction time is generally 10 hours or less, most preferably from 0.5 to 5 hours. It is preferred that the polymerization reaction is performed in an atmosphere of an inert gas, such as nitrogen gas. With respect to the polymerization reaction pressure, there is no particular limitation so long as the pressure is sufficient to maintain the monomers and solvent in a liquid state at a temperature within the above-mentioned polymerization reaction temperature range. Further, care must be taken so as to prevent impurities (such as water, oxygen and carbon dioxide gas) from entry into the polymerization reaction system, which are likely to deactivate not only the polymerization catalyst but also a living polymer being formed.

From the viewpoint of the improvement in processability of the block copolymer (I), the melt flow rate (hereinafter, frequently referred to simply as "MFR") of the block copolymer (I) is generally from 0.1 to 50 g/10 min, preferably from 1 to 20 g/10 min. In the present invention, MFR is measured in accordance with JISK-6870 under condition G (temperature: 200° C., load: 5 kg).

With respect to the polystyrene resin (II), there is no particular limitation so long as the polystyrene resin is a styrene homopolymer.

It is preferred that the weight average molecular weight of the polystyrene resin (II) is from 50,000 to 500,000, more advantageously from 100,000 to 400,000. The weight average molecular weight of the polystyrene resin (II) can be measured by GPC using a calibration curve obtained with respect to standard monodisperse polystyrene samples.

The polystyrene resin (II) can be produced by conventional methods, such as a mass polymerization and a mass-suspension polymerization. Various additives, such as mineral oil, an organic acid and an ester of an organic acid, can be added to the polystyrene resin (II).

In the block copolymer composition of the present invention, it is required that the block copolymer (I) and the polystyrene resin (II) satisfy a relationship represented by the following formula (1):

$$15+0.25BL \leq Wa \leq 35+0.25BL \tag{1}$$

wherein BL represents the vinyl aromatic hydrocarbon block ratio of the block copolymer (I), and Wa represents the weight percentage, based on the total weight of the block copolymer (I) and the polystyrene resin (II), of the block copolymer (I).

It is preferred that the block copolymer (I) and the polystyrene resin (II) satisfy a relationship represented by the following formula:

$$17.5+0.25BL \leq Wa \leq 32.5+0.25BL$$

wherein each of BL and Wa are as defined above.

It is more preferred that the block copolymer (I) and the polystyrene resin (II) satisfy a relationship represented by the following formula:

$$18.5+0.25BL \leq Wa \leq 33.5+0.25BL$$

wherein each of BL and Wa are as defined above.

When Wa is less than 15+0.25BL, the impact resistance (of a shaped article obtained from the composition) at room temperature and a temperature as low as 0° C. or lower becomes disadvantageously low. On the other hand, when Wa is larger than 35+0.25BL, the stiffness of a shaped article obtained from the composition becomes disadvantageously low.

As described above, a shaped article obtained from the block copolymer composition of the present invention exhibits less occurrence of fish eyes (FE's). The occurrence of FE's in a shaped article obtained from the block copolymer composition can be more effectively suppressed by adding to the block copolymer composition at least one stabilizer selected from the group consisting of 2-(1-(2-hydroxy-3,5-di-t-pentylphenyl)ethyl)-4,6-di-t-pentylphenyl acrylate, 2-t-butyl-6-(3-t-butyl-2-hydroxy-5-methylbenzyl)-4-methylphenyl acrylate, and 2,4-bis((octylthio)methyl)-o-cresol. The amount of the stabilizer is generally from 0.05 to 3 parts by weight, preferably from 0.1 to 2 parts by weight, relative to 100 parts by weight of the block copolymer (I).

When the amount of the stabilizer is less than 0.05 part by weight, it is difficult to obtain an appreciable improvement in suppression of occurrence of FE's over the block copolymer composition having no stabilizer incorporated therein. On the other hand, when the stabilizer is added to the block copolymer composition in an amount exceeding 3 parts by weight, the effect of suppressing the occurrence of FE's cannot be improved, as compared to the case where the stabilizer is added to the block copolymer composition in an amount of from 0.05 to 3 parts by weight.

The occurrence of FE's in a shaped article obtained from the block copolymer composition of the present invention can also be effectively suppressed by adding to the block copolymer composition at least one phenolic stabilizer selected from the group consisting of n-octadecyl-3-(3,5-di-t-butyl-4-hydroxyphenyl)propionate, tetrakis(methylene-3-(3,5-di-t-butyl-4-hydroxyphenyl)propionate)methane, 1,3,5-trimethyl-2,4,6-tris(3,5-di-t-butyl-4-hydroxybenzyl)benzene, and 2,4-bis(n-octylthio)-6-(4-hydroxy-3,5-di-t-butylanilino)-1,3,5-triazine. The amount of the stabilizer is generally from 0.05 to 3 parts by weight, relative to 100 parts by weight of the block copolymer (I). The effect of suppressing the occurrence of FE's can be enhanced by using the phenolic stabilizer in combination with at least one stabilizer selected from the above-mentioned group consisting of 2-(1-(2-hydroxy-3,5-di-t-pentylphenyl)ethyl)-4,6-di-t-pentylphenyl acrylate, 2-t-butyl-6-(3-t-butyl-2-hydroxy-5-methylbenzyl)-4-methylphenyl acrylate, and 2,4-bis((octylthio)methyl)-o-cresol.

Further, the occurrence of FE's in a shaped article obtained from the block copolymer composition of the present invention can also be effectively suppressed by adding to the block copolymer composition at least one organic phosphate or phosphite stabilizer, such as tris(nonylphenyl)phosphite, 2,2-methylenebis(4,6-di-t-butylphenyl)octylphosphite, 2-((2,4,8,10-tetrakis(1,1-dimethylethyl)dibenzo(d,f)(1,3,2)dioxaphosphepin-6-yl)oxy)-N,N-bis(2-((2,4,8,10-tetrakis(1,1-dimethylethyl)dibenzo(d,f)(1,3,2)dioxaphosphepin-6-yl)oxy)ethyl)ethaneamine, and tris(2,4-di-t-butylphenyl)phosphite. The amount of the organic phosphate or phosphite stabilizer is generally from 0.05 to 3 parts by weight, relative to 100 parts by weight of the block copolymer (I).

The effect of suppressing the occurrence of FE's can be enhanced by using the organic phosphate or phosphite stabilizer in combination with at least one stabilizer selected from the above-mentioned group consisting of 2-(1-(2-hydroxy-3,5-di-t-pentylphenyl)ethyl)-4,6-di-t-pentylphenyl acrylate, 2-t-butyl-6-(3-t-butyl-2-hydroxy-5-methylbenzyl)-4-methylphenyl acrylate, and 2,4-bis((octylthio)methyl)-o-cresol.

If desired, a non-rubber-modified styrene polymer (other than polystyrene resins) and/or a rubber-modified styrene polymer can be added to the block copolymer composition of the present invention. The amount of such a styrene polymer is generally from 0.1 to 100 parts by weight, relative to 100 parts by weight of the polystyrene resin (II). By adding such a styrene polymer to the block copolymer composition of the present invention, a shaped article obtained from the block copolymer composition can be enhanced with respect to impact resistance and the like.

Examples of non-rubber-modified styrene polymers include a copolymer comprising at least two styrene type monomers selected from styrene, an α-alkyl-substituted styrene (e.g., α-methylstyrene), an alkyl-substituted styrene which is obtained by replacing an alkyl group for a hydrogen atom bonded to a carbon atom of the aromatic nucleus of styrene, and a halogen-substituted styrene which is obtained by replacing a halogen atom for a hydrogen atom bonded to a carbon atom of the benzene nucleus of styrene. Further examples of non-rubber-modified styrene polymers include a copolymer of at least one styrene type monomer selected from the above-mentioned styrene type monomers with at least one monomer which is copolymerizable with the styrene type monomer, wherein the styrene type monomer content of the copolymer is 50% by weight or more, preferably 70% by weight or more.

Examples of monomers which are copolymerizable with the styrene type monomers include acrylic acid and esters thereof, such as an alkyl acrylate wherein the alkyl group has 1 to 12 carbon atoms (e.g., methyl acrylate, ethyl acrylate, propyl acrylate and butyl acrylate); methacrylic acid and esters thereof, such as an alkyl methacrylate wherein the alkyl group has 1 to 12 carbon atoms (e.g., methyl methacrylate, ethyl methacrylate and butyl methacrylate); α,β-unsaturated dicarboxylic acids, such as fumaric acid, maleic acid and itaconic acid; and monoesters, diesters, anhydrides or imides of α,β-unsaturated dicarboxylic acids (e.g., maleic anhydride and maleimide). These monomers can be used individually or in combination.

Preferred examples of non-rubber-modified styrene polymers include a styrene/n-butyl acrylate copolymer and a styrene/methyl methacrylate copolymer.

On the other hand, examples of rubber-modified styrene polymers include a polymer obtained by polymerizing at least one monomer (selected from the group consisting of the above-mentioned styrene type monomers and the above-mentioned monomers which are copolymerizable with the styrene type monomers) with a rubber, such as a polybutadiene, a styrene/butadiene copolymer rubber or an ethylene/propylene/diene copolymer rubber. Of these rubber-modified styrene polymers, a rubber-modified polystyrene is preferred.

The block copolymer composition of the present invention can be produced by any conventional method. Examples of such conventional methods include a melt-kneading method using a mixer generally used in the art, such as an open roll, an intensive mixer, an internal mixer, Ko-kneader, a continuous kneader having a twin-rotor, or an extruder, and a method in which each component is dissolved or dispersed in a solvent, followed by removal of the solvent by heating.

If desired, an additive other than the above-mentioned stabilizers can be added to the block copolymer composition of the present invention. Examples of additives include polymers, such as a vinyl aromatic hydrocarbon/conjugated diene block copolymer elastomer wherein the vinyl aromatic hydrocarbon monomer unit content is 50% by weight or less, a hydrogenation product thereof, and a polyethylene terephthalate.

Further examples of additives include those which have been conventionally used as additives for plastics. Examples of such additives include inorganic reinforcing agents, such as glass fibers, glass beads, silica, calcium carbonate and talc; organic reinforcing agents, such as organic fibers and a coumarone-indene resin; crosslinking agents, such as an organic peroxide and an inorganic peroxide; pigments, such as titanium white, carbon black and an iron oxide; dyes; flame retardants; antioxidants; ultraviolet light absorbers; antistatic agents; lubricants; plasticizers; fillers other than mentioned above; and mixtures thereof.

The block copolymer composition of the present invention per se or a mixture thereof with a coloring agent can be molded by the same molding method as employed in the molding of an ordinary thermoplastic resin to obtain shaped articles for use in various application fields. For example, the molding can be conducted by extrusion molding, injection molding or blow molding to obtain a container for parts of office automation apparatuses, daily commodities, food, miscellaneous goods, and parts of light electric appliances. Especially, the block copolymer composition of the present invention can be advantageously used for producing a wrapping film, a laminate film for a foam container or the like, a blister case for food or parts of light electric appliances, a food container which is required to have an impact resistance at low temperatures, and the like.

Hereinbelow, an explanation is made with respect to the method of the present invention for producing an excellent sheet or an excellent film, which comprises subjecting the block copolymer composition of the present invention to extrusion in an extruder. The excellent sheet or film produced by the method of the present invention can be advantageously used for producing an ultimate product having an excellent dimensional stability.

In the method of the present invention, it is required that the temperature of the composition be from 190 to 250° C. as measured when the composition is extruded through a die of the extruder (hereinafter, this temperature is frequently referred to as the "die-through temperature" of the composition). The die-through temperature of the composition is preferably from 195 to 245° C., more preferably from 200 to 240° C. When the die-through temperature of the composition is lower than 190° C., the kneading of the composition during the extrusion thereof becomes unsatisfactory. On the other hand, when the die-through temperature of the composition is higher than 250° C., a shaped article obtained from the composition suffers marked occurrence of FE's.

With respect to the method for extruding the composition, there is no particular limitation. Examples of methods for extruding the composition include a T-die cast method and an inflation method.

The residence time of the composition in the extruder is preferably from 1 to 10 minutes, more preferably from 2 to 5 minutes.

It is required that the sheet or film have a ratio of the modulus in tension as measured in the machine direction of the extruder to the modulus in tension as measured in the traverse direction (i.e., a direction perpendicular to the machine direction) in the range of from 0.6 to 1.5, wherein the machine direction of the extruder is defined as the direction of the extrusion (hereinafter, the direction of the extrusion is frequently referred to simply as the "machine direction"). The above-mentioned modulus ratio is preferably from 0.65 to 1.45, more preferably from 0.7 to 1.4.

The above-mentioned modulus ratio can be appropriately controlled by effecting orientation of the sheet or film extruded from the extruder in the machine direction or traverse direction. Examples of methods for effecting orientation of the sheet or film in the machine direction include a method which comprises increasing the haul-off rate of the sheet or film. Examples of methods for effecting orientation of the sheet or film in the traverse direction include a method using a tenter.

When the above-mentioned modulus ratio of the sheet or film is less than 0.6 or more than 1.5, it is likely that the dimensional stability of an ultimate product obtained from the sheet or film is unsatisfactory. For example, when a deep-draw formed product, such as a cup, is produced from the sheet or film wherein the above-mentioned modulus ratio is less than 0.6 or more than 1.5, it is likely that the thickness of the body portion of the cup is nonuniform, or the cup has a poor dimensional stability with respect to the opening diameter or height.

BEST MODE FOR CARRYING OUT THE INVENTION

Hereinbelow, the present invention will be described in more detail with reference to the following Examples and Comparative Examples, which should not be construed as limiting the scope of the present invention.

Various properties of block copolymers used in the following Examples and Comparative Examples were measured and calculated according to the following methods.

(1) Melt Flow Rate (MFR):

MFR is measured in accordance with JISK-6870 under condition G prescribed therein (temperature: 200° C., load: 5 kg).

(2) Styrene Block Ratio of a Block Copolymer:

A predetermined amount (30 to 50 mg) of a block copolymer is accurately weighed and added to about 10 ml of chloroform. To the resultant mixture are added osmium tetraoxide as a catalyst and tert-butyl hydroperoxide as an oxidizing agent, followed by boiling at 95° C. for 20 minutes, thereby effecting the oxidative degradation reaction of the block copolymer. To the resultant reaction mixture is added 200 ml of methanol to precipitate a polystyrene. The precipitated polystyrene is filtered off by means of a glass filter which has a pore size identification No. 4 as specified in JIS R3503 (11G4, manufactured and sold by Shibata Scientific Technology Ltd., Japan), thereby obtaining a filtration residue composed of a polystyrene. The obtained filtration residue composed of a polystyrene is weighed. The styrene block ratio (% by weight) is calculated by the following formula:

Styrene block ratio (% by weight)=(the weight of the filtration residue/the total weight of the styrene monomer units in the predetermined amount of the block copolymer)×100.

The total weight of the styrene monomer units in the predetermined amount (30 to 50 mg) of the block copolymer is obtained as follows. From the weight of each of the monomers charged in the production of the block copolymer, the weight ratio ($r_c$) of the styrene monomer units in the block copolymer to the block copolymer is calculated. The total weight of the styrene monomer units in the predetermined amount of the block copolymer is the product of the accurate weight of the predetermined amount of the block copolymer multiplied by the above-mentioned weight ratio ($r_c$).

Hereinafter, the value $r_c \times 100$ (% by weight), i.e., the weight percentage of styrene monomer units in the block copolymer, based on the weight of the block copolymer, is frequently referred to as the "styrene content" of the block copolymer.

Further, in the following Examples and Comparative Examples, the following measurements and evaluations were made.

(1) Die-through Temperature:

At the point in time of 0.5 second after a sheet of a composition is extruded from the extruder, a metal terminal of a digital thermometer is contacted with the sheet to measure the temperature of the sheet. The found value of the temperature of the sheet is defined as the die-through temperature of the composition.

(2) Modulus in Tension (Index for Stiffness) and Elongation at Break:

With respect to a test sample in the form of a sheet having a width of 12.7 mm, the measurement is done at a pulling rate of 5 mm/min with respect to each of the machine direction and the traverse direction, wherein the distance between the gage marks is 50 mm.

(3) Surface Impact Strength (Index for Impact Resistance):

The measurement is done at 23° C. and at 0° C. in accordance with ASTM D1709, except that the radius of the bottom of the weight is 1.0 inch, to obtain a 50% breakage value.

(4) Haze:

The surface of a sheet is coated with liquid paraffin and, then, the haze of the sheet is measured in accordance with ASTM D1003.

(5) Fish Eye (FE):

A composition is subjected to a continuous extrusion using a 40 mm sheet extruder (USV 40 mm extruder, manufactured and sold by Union Plastics Co. Ltd., Japan) under conditions wherein the die-through temperature of the composition is 225° C., thereby continuously producing sheets having a thickness of 0.25 mm. With respect to each of the sheets produced at the points in time of 5 minutes and 6 hours after the start of the continuous extrusion, the number of FE's having a size of 0.5 mm or more observed per 300 $cm_2$ of the sheet is counted. Based on the difference in the number of FE's between the two sheets, the occurrence of FE's is evaluated as follows:

○: The difference is 100 or less.

X: The difference is more than 100.

In the following Examples and Comparative Examples, as a polystyrene resin, A & M Polystyrene HF77 (manufactured and sold by A & M Styrene Co., Ltd., Japan) was used. The weight average molecular weight of the polystyrene resin (A & M Polystyrene HF77) was measured by GPC using a calibration curve obtained with respect to standard monodisperse polystyrene samples, and found to be about 200,000.

EXAMPLE 1

Block copolymer A-1 was produced as follows. A polymerization reaction was performed using a polymerization reaction system containing cyclohexane as a solvent and n-butyllithium as a polymerization initiator as well as monomers, wherein the monomers were successively added in the order and weight ratios as indicated in Table 1 at an uppermost, right-hand column entitled "polymer configuration" and polymerized from the left end toward the right end of the "polymer configuration" shown in Table 1 at its uppermost, right-hand column. Thereafter, for completely terminating the polymerization reaction, methanol was added to the polymerization reaction system, followed by stirring. Then, stabilizers were added to the polymerization reaction system, wherein the types and amounts of the stabilizers are indicated in Tables 2. Then, the solvent was removed from the polymerization reaction system, thereby obtaining block copolymer A-1 in the form of a mixture thereof with the stabilizers. With respect to the method for producing block copolymer A-1, a more illustrative explanation is made below.

A 30-liter sealed reactor having a jacket was purged with nitrogen gas. Into the reactor was charged a 20% by weight solution of a mixture of 3 parts by weight of isoprene and 4 parts by weight of 1,3-butadiene in cyclohexane. Into the reactor was charged 0.086 part by weight of n-butyllithium. A first polymerization reaction was performed at 80° C. for 20 minutes while maintaining the pressure in the reactor within the range of from 3 to 5 $kg/cm^2G$. A 20% by weight solution of 22 parts by weight of styrene in cyclohexane was charged at one time into the reactor and a second polymerization reaction was performed at 80° C. for 20 minutes. Then, a 20% by weight solution of a mixture of 1 part by weight of isoprene and 3 parts by weight of 1,3-butadiene in cyclohexane was charged at one time into the reactor and a third polymerization reaction was performed at 80° C. for 10 minutes. A fourth polymerization reaction was performed at 80° C. while continuously charging over 30 minutes into the reactor a 20% by weight solution of a mixture of 6 parts by weight of isoprene, 12 parts by weight of 1,3-butadiene and 5 parts by weight of styrene in cyclohexane. Then, a 20% by weight solution of 44 parts by weight of styrene in cyclohexane was charged at one time into the reactor and a fifth polymerization reaction was performed at 80° C. for 35 minutes. Thereafter, methanol was fed to the reactor in an equimolar amount to the amount of n-butyllithium used, followed by stirring for 5 minutes and subsequent addition of stabilizers. Then, the cyclohexane solvent was removed from the reactor. Thus, block copolymer A-1 was obtained in the form of a mixture thereof with the stabilizers.

The styrene content and isoprene/1,3-butadiene weight ratio of block copolymer A-1 are shown in Table 1.

The measurement of the styrene block ratio of block copolymer A-1 was conducted by the above-mentioned method with respect to a sample of block copolymer A-1, which was taken before the addition of the stabilizers. The result is shown in Table 1.

The MFR of block copolymer A-1 was measured by the above-mentioned method with respect to a mixture of block copolymer A-1 with the stabilizers, and found to be 8.

The above-obtained mixture of block copolymer A-1 with the stabilizers, and a polystyrene resin, in amounts indicated in Table 2, were fed to a 40 mm sheet extruder (USV 40 mm extruder, manufactured and sold by Union Plastics Co. Ltd., Japan) and extruded through the extruder under conditions wherein the die-through temperature of the composition was 200° C., while increasing the haul-off rate of the sheet so as to effect orientation of the sheet in the machine direction., thereby obtaining a sheet having a thickness of 1.2 mm.

The modulus in tension (with respect to each of the machine and traverse directions), elongation at break, surface impact strength and haze of the obtained sheet were measured by the above-mentioned methods. Further, the ratio of the modulus in tension (with respect to the machine direction) to the modulus in tension (with respect to the traverse direction) was calculated. The results are shown in Table 2.

The above-obtained mixture of block copolymer A-1 with the stabilizers, and the polystyrene resin, in amounts indicated in Table 2, were also fed to a 40 mm sheet extruder (USV 40 mm extruder, manufactured and sold by Union Plastics Co. Ltd., Japan) and extruded, to thereby obtain a sheet of a composition (comprising block copolymer A-1, the polystyrene resin and the stabilizers). The FE of the sheet was evaluated by the above-mentioned method. The result of the evaluation is shown in Table 2.

EXAMPLES 2 TO 6 AND COMPARATIVE EXAMPLES 1 to 4

In Examples 2, 3, 4, 5 and 6, and Comparative Examples 1, 2, 3 and 4, block copolymers A-2, A-3, A-4, A-5 and A-6, and block copolymers A-7, A-8, A-9 and A-10 were produced, respectively.

These block copolymers were produced by substantially the same method as employed in Example 1 for producing block copolymer A-1. Specifically, each of these block copolymers was produced as follows. A polymerization reaction was performed using a polymerization reaction system containing cyclohexane as a solvent and n-butyllithium as a polymerization initiator as well as monomers, wherein the monomers were successively added in the order and weight ratios as indicated in Table 1 at an uppermost, right-hand column entitled "polymer configuration" and polymerized from the left end toward the right end of the "polymer configuration" shown in Table 1 at its uppermost, right-hand column. Thereafter, for completely terminating the polymerization reaction, methanol was added to the polymerization reaction system, followed by stirring. Then, stabilizers were added to the polymerization reaction system, wherein the types and amounts of the stabilizers are indicated in Tables 2. Then, the solvent was removed from the polymerization reaction system, thereby obtaining a block copolymer in the form of a mixture thereof with the stabilizers. It should be noted that, in the production of block copolymer A-5, before the adding of methanol to the polymerization reaction system, silicon tetrachloride was added to the polymerization reaction system in a molar amount 0.25 time the molar amount of the amount of n-butyllithium used (in the production of each of block copolymers (Examples) A-2, A-3, A-4 and A-6, and block copolymers (Comparative Examples) A-7, A-8, A-9 and A-10, the addition of silicon tetrachloride was not conducted styrene content (% by weight) and isoprene/1,3-butadiene weight ratio of each of block copolymers (Examples) A-2 to A-6, and block copolymers (Comparative Examples) A-7 to A-10 are shown in Table 1.

With respect to the styrene block ratio of each of block copolymers (Examples) A-2 to A-6, and block copolymers (Comparative Examples) A-7 to A-10, the measurement thereof was done by the above-mentioned method with respect to a sample of the block copolymer, which was taken before the addition of the stabilizers. The results are shown in Table 1.

The MFR of each of block copolymers (Examples) A-2 to A-6, and block copolymers (Comparative Examples) A-7 to A-10 was measured by the above-mentioned method with respect to a mixture of each block copolymer with the stabilizers. As a result, it was found that the MFR's of block copolymers (Examples) A-2, A-3, A-4, A-5 and A-6, and block copolymers (Comparative Examples) A-7, A-8, A-9 and A-10 were 9, 7, 10, 8 and 7, and 6, 9, 10 and 8, respectively.

In each of Examples 2 to 6 and Comparative Examples 1 to 4, the above-obtained block copolymer/stabilizer mixture and a polystyrene resin in amounts indicated in Table 2 were fed to a 40 mm sheet extruder (USV 40 mm extruder, manufactured and sold by Union Plastics Co. Ltd., Japan) and extruded through the extruder under conditions wherein the die-through temperature of the composition was 200° C., while increasing the haul-off rate of the sheet so as to effect orientation of the sheet in the machine direction, thereby obtaining a sheet having a thickness of 1.2 mm.

The modulus in tension (with respect to each of the machine and traverse directions), elongation at break, surface impact strength and haze of the obtained sheet were measured by the above-mentioned methods. Further, the ratio of the modulus in tension (with respect to the machine direction) to the modulus in tension (with respect to the traverse direction) was calculated. The results are shown in Table 2.

The block copolymer/stabilizer mixture and the polystyrene resin in amounts indicated in Table 2 were also fed to a 40 mm sheet extruder (USV 40 mm extruder, manufactured and sold by Union Plastics Co. Ltd., Japan) and extruded, to thereby obtain a sheet of a composition (comprising the block copolymer, the polystyrene resin and the stabilizers). The FE of the sheet was evaluated by the above-mentioned method. The result of the evaluation is shown in Table 2.

COMPARATIVE EXAMPLES 5 AND 6

In each of Comparative Examples 5 and 6, a block copolymer A-1/stabilizer mixture (which was produced in Example 1) and a polystyrene resin in amounts indicated in Table 2 were fed to a 40 mm sheet extruder (USV 40 mm extruder, manufactured and sold by Union Plastics Co. Ltd., Japan) and extruded through the extruder under conditions wherein the die-through temperature of the composition was 200° C., while increasing the haul-off rate of the sheet so as to effect orientation of the sheet in the machine direction, thereby obtaining a sheet having a thickness of 1.2 mm.

The modulus in tension (with respect to each of the machine and traverse directions), elongation at break, surface impact strength and haze of the obtained sheet were measured by the above-mentioned methods. Further, the ratio of the modulus in tension (with respect to the machine direction) to the modulus in tension (with respect to the traverse direction) was calculated. The results are shown in Table 2.

A block copolymer A-1/stabilizer mixture and the polystyrene resin in amounts indicated in Table 2 were also fed to a 40 mm sheet extruder (USV 40 mm extruder, manufactured and sold by Union Plastics Co. Ltd., Japan) and extruded, to thereby obtain a sheet of a composition (comprising block copolymer A-1, the polystyrene resin and the stabilizers). The FE of the sheet was evaluated by the above-mentioned method. The result of the evaluation is shown in Table 2.

EXAMPLE 7

A sheet having a thickness of 1.2 mm was obtained in substantially the same manner as in Example 1, except that the die-through temperature of the composition was 240° C. and the orientation of the sheet was effected in the traverse direction by means of a tenter. The modulus in tension (with respect to each of the machine and traverse directions), elongation at break, surface impact strength and haze of the obtained sheet were measured by the above-mentioned methods.

The results of the measurements were as follows. The moduli in tension with respect to the machine and traverse directions were 12,300 kgf/cm$^2$ and 17,700 kgf/cm$^2$, respectively. The ratio of the modulus in tension (with respect to the machine direction) to the modulus in tension (with respect to the traverse direction) was 0.69. The elongations at break with respect to the machine and traverse directions were 75% and 35%, respectively. The haze was 4.4. The surface impact strengths at 23° C. and at 0° C. were 36 kg·cm and 29 kg·cm, respectively.

EXAMPLES 8 AND 9

In Examples 8 and 9, the sheets having a thickness of 1.2 mm which were obtained in Examples 1 and 2, respectively, were subjected to an air-pressure forming using an air-pressure forming machine (VPF3030, manufactured and sold by United Mold Corporation, Japan) to thereby produce cups having an opening diameter of 8 cm, a bottom diameter of 5 cm and a height of 11 cm. In each of Examples 8 and 9, the cup obtained had a uniform thickness with respect to the body portion thereof. When the cup was grasped for evaluating the stiffness thereof, a feeling of uniform stiffness was obtained. Each of the opening and bottom of the cup had an almost perfectly circular morphology.

TABLE 1

|  | Styrene content (wt %) | Isoprene/1,3-butadiene weight ratio | Block ratio (wt %) | Polymer configuration *1 |
| --- | --- | --- | --- | --- |
| A-1 | 71 | 34/66 | 93 | Ip/Bd(3/4)-St(22)-Ip/Bd(1/3)-Ip/Bd/St(6/12/5)-St(44) |
| A-2 | 82 | 44/56 | 82 | St(37)-Ip/Bd/St(8/10/15)-St(30) |
| A-3 | 76 | 33/67 | 76 | St(32)-Ip/Bd(3/7)-Ip/Bd/St(5/9/18)-St(26) |
| A-4 | 68 | 50/50 | 87 | St(15)-Ip/Bd(7/4)-Ip/Bd/St(9/12/9)-St(44) |
| A-5 | 73 | 11/89 | 82 | [St(45)-Ip/Bd/St(2/22/13)-St(15)-Ip/Bd(1/2)]$_4$X |
| A-6 | 77 | 35/65 | 77 | St(30)-Ip/Bd/St(8/15/18)-St(29) |
| A-7 | 55 | 2/98 | 96 | Ip/Bd(1/22)-St(10)-Bd/St(22/2)-St(43) |
| A-8 | 97 | 67/33 | 94 | St(43)-Ip/Bd/St(2/1/6)-St(48) |
| A-9 | 70 | 27/73 | 47 | St(18)-Ip(5)-Ip/Bd/St(3/22/37)-St(15) |
| A-10 | 75 | 92/8 | 80 | St(20)-Ip/Bd(8/1)-Ip/Bd/St(8/1/15)-Ip(7)-St(40) |

Notes:
*1: Each Ip independently represents an isoprene polymer block, each St independently represents a styrene polymer block, each Ip/Bd independently represents an isoprene/1,3-butadiene copolymer block, Bd/St represents a 1,3-butadiene/styrene copolymer block, each Ip/Bd/St independently represents an isoprene/1,3-butadiene/styrene copolymer block, and X represents a silicon tetrachloride residue. Figures shown in parentheses indicate the amounts of components (% by weight).

TABLE 2

|  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- | --- | --- | --- | --- | --- | --- |
| Composition |  |  |  |  |  |  |  |  |  |  |  |  |
| Polystyrene resin (wt %) *1 | 50 | 46 | 52 | 55 | 55 | 47 | 42 | 70 | 35 | 50 | 67 | 35 |
| Type and amount of the block copolymer (wt %) *2 | A-1 50 | A-2 54 | A-3 48 | A-4 45 | A-5 45 | A-6 53 | A-7 58 | A-8 30 | A-9 65 | A-10 50 | A-1 33 | A-1 65 |
| Stabilizer |  |  |  |  |  |  |  |  |  |  |  |  |
| Type of the stabilizer *3 | A/D | A/B/C | A/C/F | A/D/E | A/B/F | A/D/F | E/F | A/E | A/D | A/F | A/D | A/D |
| Amount of the stabilizer (part by weight) *4 | A: 0.3 D: 0.2 | A: 0.2 B: 0.3 C: 0.1 | A: 0.2 C: 0.4 F: 0.3 | A: 1.2 D: 0.5 E: 0.1 | A: 0.5 B: 0.2 F: 0.3 | A: 0.4 D: 0.3 F: 0.5 | E: 0.1 F: 0.2 | A: 0.1 E: 0.3 | A: 0.2 D: 0.1 | A: 0.2 F: 0.5 | A: 0.3 D: 0.2 | A: 0.3 D: 0.2 |
| Properties of the sheet |  |  |  |  |  |  |  |  |  |  |  |  |
| Modulus in tension (kgf/cm$^2$): |  |  |  |  |  |  |  |  |  |  |  |  |
| Machine direction | 17600 | 18300 | 17600 | 17100 | 17800 | 17100 | 11200 | 29300 | 9200 | 17900 | 19400 | 9400 |
| Traverse direction | 11900 | 13400 | 16300 | 12000 | 13600 | 16500 | 7200 | 28500 | 6500 | 12300 | 17600 | 7200 |
| Ratio of the modulus in tension (with respect to the machine direc- | 1.48 | 1.37 | 1.08 | 1.43 | 1.31 | 1.04 | 1.56 | 1.03 | 1.42 | 1.46 | 1.10 | 1.31 |

TABLE 2-continued

|  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|
| tion) to the modulus in tension (with respect to the traverse direction) Elongation at break (%): | | | | | | | | | | | | |
| Machine direction | 40 | 20 | 35 | 50 | 40 | 35 | 150 or more | 3 or less | 150 or more | 50 | 10 | 150 or more |
| Traverse direction | 85 | 35 | 45 | 65 | 50 | 40 | 150 or more | 3 or less | 150 or more | 65 | 5 | 150 or more |
| Surface impact strength (kg · cm): | | | | | | | | | | | | |
| At 23° C. | 38 | 27 | 30 | 58 | 35 | 55 | 200 or more | 3 or less | 200 or more | 41 | 6 | 200 or more |
| At 0° C. | 31 | 20 | 23 | 44 | 24 | 50 | 164 | 3 or less | 16 | 3 or less | 3 | 200 or more |
| Haze (%) | 4.3 | 1.7 | 3.4 | 4.7 | 4.3 | 2.9 | 13.1 | 0.8 | 5.2 | 3.3 | 2.4 | 2.8 |
| FE | ○ | ○ | ○ | ○ | ○ | ○ | X | ○ | ○ | ○ | ○ | ○ |

Notes:
*1: The amount of the polystyrene resin is indicated in terms of % by weight, based on the total weight of the polystyrene resin and the block copolymer.
*2: The amount of the block copolymer is indicated in terms of % by weight, based on the total weight of the polystyrene resin and the block copolymer.
*3: Stabilizer A: 2-(1-(2-hydroxy-3,5-di-t-pentylphenyl)ethyl)-4,6-di-t-pentylphenyl acrylate
Stabilizer B: 2-t-butyl-6-(3-t-butyl-2-hydroxy-5-methylbenzyl)-4-methylphenyl acrylate
Stabilizer C: 2,4-bis((octylthio)methyl)-o-cresol
Stabilizer D: n-octadecyl-3-(3,5-di-t-butyl-4-hydroxyphenyl)propionate
Stabilizer E: tetrakis(methylene-3-(3,5-di-t-butyl-4-hydroxyphenyl)propionate)methane
Stabilizer F: tris(nonylphenyl)phosphite
*4: The amounts of the stabilizers are indicated in terms of parts by weight, relative to 100 parts by weight of the block copolymer.

INDUSTRIAL APPLICABILITY

A shaped article produced from the composition of the present invention exhibits not only less occurrence of fish eyes, but also has excellent impact resistance at a temperature as low as 0° C. or lower, excellent transparency, excellent stiffness and excellent elongation. Therefore, the composition of the present invention can be advantageously used in various application fields. For example, the composition of the present invention can be molded by extrusion molding, injection molding, blow molding or the like to obtain a container for parts of office automation apparatuses, daily commodities, food, miscellaneous goods, and parts of light electric appliances. Especially, the composition of the present invention can be advantageously used for producing a wrapping film, a laminate film for a foam container or the like, a blister case for food or parts of light electric appliances, a food container which is required to have an impact resistance at low temperatures, and the like.

What is claimed is:

1. A block copolymer composition comprising:
   (I) a block copolymer comprising:
   at least two polymer blocks, each polymer block (S) comprising at least 70% by weight of vinyl aromatic hydrocarbon monomer units, and
   at least one polymer block (B) comprising one or more unit polymer blocks selected from the group consisting of the following unit polymer blocks (a), (b) and (c):
   (a) a unit polymer block comprising isoprene monomer units and optionally vinyl aromatic hydrocarbon monomer units,
   (b) a unit polymer block comprising 1,3-butadiene monomer units and optionally vinyl aromatic hydrocarbon monomer units, and
   (c) a unit polymer block comprising isoprene monomer units, 1,3-butadiene monomer units and optionally vinyl aromatic hydrocarbon monomer units,
   wherein the content of the vinyl aromatic hydrocarbon monomer units in each of said unit polymer blocks (a), (b) and (c) is 0 to less than 70% by weight,
   wherein:
   (B-1) at least one unit polymer block (a) and at least one unit polymer block (b) are present in combination as said at least one polymer block (B),
   (B-2) at least one unit polymer block (a) and at least one unit polymer block (c) are present in combination as said at least one polymer block (B),
   (B-3) at least one unit polymer block (a), at least one unit polymer block (b) and at least one unit polymer block (c) are present in combination as said at least one polymer block (B),
   (B-4) at least one unit polymer block (b) and at least one unit polymer block (c) are present in combination as said at least one polymer block (B), or
   (B-5) at least one unit polymer block (c) alone is present as said at least one polymer block (B), so that said at least one polymer block (B) contains isoprene monomer units and 1,3-butadiene monomer units,
   the amount of the vinyl aromatic hydrocarbon monomer units in said block copolymer (I) and the total amount of the isoprene monomer units and the 1,3-butadiene monomer units in said block copolymer (I) being, respectively, from 60 to 95% by weight and from 40 to 5% by weight, each based on the weight of said block copolymer (I)
   said block copolymer (I) having an isoprene monomer unit/1,3-butadiene monomer unit weight ratio of from 5/95 to less than 55/45, and
   wherein said block copolymer (I) has a vinyl aromatic hydrocarbon block ratio (BL) of from 60 to 100% by weight,
   wherein said vinyl aromatic hydrocarbon block ratio is defined as the weight percentage, based on the total weight of vinyl aromatic hydrocarbon monomer units contained in said block copolymer (I), of a vinyl aromatic hydrocarbon polymer collected by filtration from a reaction mixture obtained by subjecting said block copolymer (I) to an oxidative degradation reaction with tert-butyl hydroperoxide in the presence of osmium tetraoxide at 95° C. in chloroform, wherein said filtration is conducted by means of a glass filter which has a pore size identification No. 4 as specified in JIS R3503, and (II) a polystyrene resin, wherein said block copolymer (I) and said polystyrene resin (II) satisfy a relationship represented by the following formula (1):

$$15+0.25BL \leq Wa \leq 35+0.25BL \tag{1}$$

wherein BL represents said vinyl aromatic hydrocarbon block ratio of the block copolymer (I), and Wa represents the weight percentage, based on the total weight of said block copolymer (I) and said polystyrene resin (II), of said block copolymer (I).

2. The block copolymer composition according to claim 1, which further comprises at least one stabilizer in an amount of from 0.05 to 3 parts by weight, relative to 100 parts by weight of said block copolymer (I), wherein said stabilizer is selected from the group consisting of 2-(1-(2-hydroxy-3,5-di-t-pentyl-phenyl)ethyl)-4,6-di-t-pentylphenyl acrylate, 2-t-butyl-6-(3-t-butyl-(2-hydroxy-5-methylbenzyl)-4-methylphenyl acrylate, and 2,4-bis ((octylthio) methyl)-o-cresol.

3. The block copolymer composition according to claim 1, wherein said isoprene monomer unit/1,3-butadiene monomer unit weight ratio of said block copolymer (I) is in the range of from 10/90 to less than 55/45.

4. A method for producing a sheet or a film, which comprises subjecting the block copolymer composition of any one of claims 1 to 3 to extrusion in an extruder under conditions wherein the temperature of said composition is from 190 to 250° C. as measured when said composition is extruded through a die of said extruder, said extrusion being performed such that said sheet or film has a ratio of the modulus in tension as measured in the machine direction to the modulus in tension as measured in the traverse direction in the range of from 0.6 to 1.5.

* * * * *